No. 654,027. Patented July 17, 1900.
J. SHELLABARGER.
PNEUMATIC WHEEL.
(Application filed June 7, 1900.)
(No Model.)
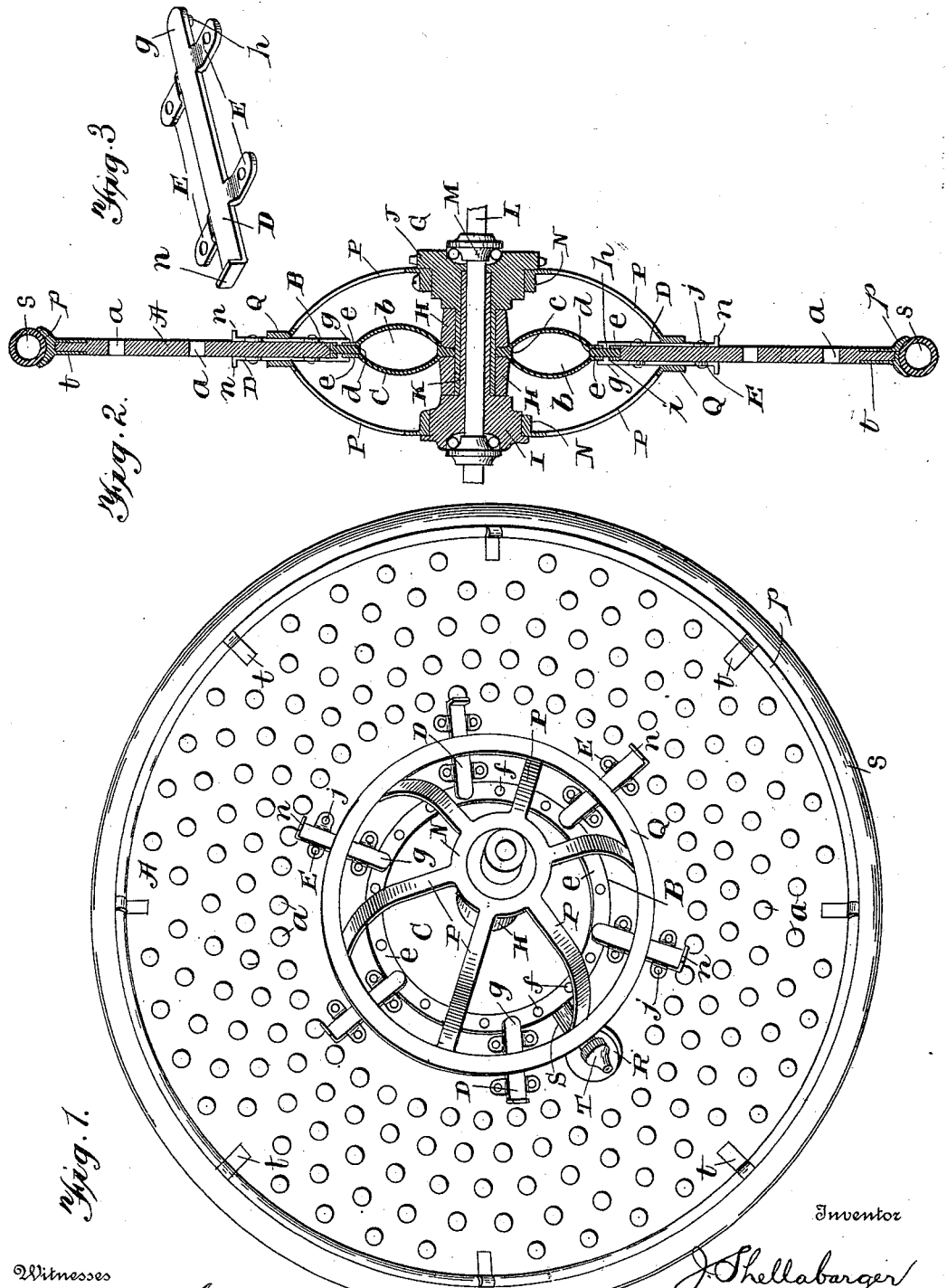
Witnesses
Geo. E. Frech.
Chas. R. Wright Jr.
Inventor
J. Shellabarger
By A. S. Pattison, Attorney

UNITED STATES PATENT OFFICE.

JOSHUA SHELLABARGER, OF ROCKFORD, OHIO, ASSIGNOR OF ONE-FOURTH TO JOHN W. SMITH, OF SAME PLACE.

PNEUMATIC WHEEL.

SPECIFICATION forming part of Letters Patent No. 654,027, dated July 17, 1900.

Application filed June 7, 1900. Serial No. 19,414. (No model.)

*To all whom it may concern:*

Be it known that I, JOSHUA SHELLABARGER, a citizen of the United States, residing at Rockford, in the county of Mercer and State of Ohio, have invented new and useful Improvements in Pneumatic Wheels, of which the following is a specification.

My invention relates to improvements in pneumatic wheels, all of which will be fully described hereinafter and particularly pointed out in the claims.

The object of my invention is to provide an improved pneumatic wheel having a centrally-arranged pneumatic cushion through which the hub passes and to which it is secured, the hub carrying at opposite sides of the body portion of the wheel supporting members adapted to engage and slide upon the body of the wheel. By means of an arrangement of this kind I am enabled to use an ordinary solid tire upon the rim of the wheel and obtain the pneumatic effect by the pneumatic cushion at the center, and thus avoid the troublesome and annoying puncture of pneumatic tires in the use of a wheel of the ordinary construction with a pneumatic tire upon its rim.

In the accompanying drawings, Figure 1 is a perspective view of a wheel embodying my invention. Fig. 2 is a cross-sectional view taken through the hub of the wheel. Fig. 3 is a detached view of one of the combined friction and holding members, cleats, or plates which are secured to the body of the wheel and hold the pneumatic cushion in place.

Referring now to the drawings, A is the body portion of the wheel, which is composed of sheet perforated aluminium, papier-mâché, or other suitable light and strong material. This body portion, as shown, is provided over its entire surface with numerous perforations $a$ for the purpose of making it light without detracting materially from its strength. The center of this body portion A is provided with an opening B, in which is situated the pneumatic cushion C.

The pneumatic cushion C consists of an annular hollow air-receiving portion $b$, a solid central portion $c$, and a solid rim or surrounding portion $d$. Applied to opposite sides of the solid rim portion of the pneumatic cushion are the metallic bands $e$, which are secured thereto by means of screws or bolts $f$, which pass through the said bands and the solid portion or rim of the cushion. For the purpose of holding this pneumatic cushion in position in the central opening of the body A of the wheel I provide at opposite sides of the body portion of the wheel a plurality of radially-extending holding members D, which have their inner ends $g$ overlapping the metallic bands of the pneumatic cushion and these overlapping ends provided with inwardly-projecting studs $h$, which enter openings $i$, formed in the said bands. These holding members are provided with laterally-projecting ears E, through and into which holding screws or bolts $j$ are passed, which serve to unite these holding members to the body portion A of the wheel.

The hub G is composed of two parts H, which are situated at opposite sides of the solid center portion of the pneumatic cushion, and the two outer portions I and J. The outer portion I has a tubular portion K passing through the two inner portions H and into the outer portion J, and through these several parts the usual spindle L passes, and the hub and the spindle have coacting ball-bearings M of the usual construction.

Connected to the outer portions I and J of the hub are the sleeves N, which are secured to the outer portions at opposite sides of the body portion A of the wheel by means of set-screws. Projecting radially and curved inwardly from these sleeves and made rigid therewith are the arms P, which have their outer ends connected with the rings or bands Q, the said rings or bands Q resting upon and engaging the outer surfaces of the pneumatic-cushion-holding members D. From this description it will be seen that through the medium of the arms connected with the sleeves that are attached to the ends of the hub and the bands or rings connected to the outer ends of the arms which rest against the holding members, as before described, the hub is supported in a position at right angles to the body portion of the wheel, while at the same time the wheel is permitted to have a lateral or yielding motion relative to the hub for the purpose of taking up the roughness or vibration caused in passing over the road. When the body portion A of the wheel vibrates in respect to the hub, the bands slide upon the outer surfaces of the holding members, and for the purpose of limiting the amount of movement which will be permitted between the body portion of the wheel and the hub the outer ends n of the holding members are turned outward laterally, as shown, whereby the bands will engage these outturned ends when the vibrations of the parts have reached their limit of movement, and thus preventing destruction or injury to the pneumatic cushion, which might otherwise occur.

The body portion A of the wheel is provided with a suitable opening R, which is in communication with the central opening which contains the pneumatic cushion by means of a slot S, and passing through this slot and into the opening R is the nipple T, through which air is pumped into the inner hollow portion of the pneumatic cushion, the said opening R being for the purpose of permitting access to the said nipple for the purpose of inflating the pneumatic cushion, as will be readily understood.

Surrounding the periphery of the body portion A of the wheel is a concaved rim p, which is provided with inwardly-projecting clips t at opposite sides of the said body portion and which serve to hold the concaved rim in position thereon. Situated within this rim will be a solid or cushion tire s of any desired form.

By means of a wheel constructed as here shown I am enabled to obtain the pneumatic effect without any danger of puncturing the pneumatic member, which is a great advantage over the usual pneumatic tire now in use. I am also enabled to obtain a very easy riding wheel, making the vehicle comfortable to the rider.

Having thus described my invention, what I claim, and desire to secure by Letters Patent, is—

1. A wheel comprising a main or body portion, having a central opening, a pneumatic cushion secured within said opening, a hub secured to the center of the said cushion, the ends of the hub provided with inwardly-curved and radially-projecting arms having their outer ends engaging opposite sides of the main or body portion of the wheel for supporting the hub at right angles thereto, substantially as described.

2. A wheel comprising a main or body portion having a central opening, a pneumatic cushion situated within the said opening, a hub secured to the center of the said cushion, the ends of the hub provided with radially and inwardly extending arms, and bands connecting the ends of the arms, the said bands engaging opposite sides of the main or body portion of the wheel for supporting the hub at right angles thereto, substantially as described.

3. A pneumatic wheel comprising a main or body portion having a central opening, a pneumatic cushion secured within the said opening, the said cushion having an annular hollow inflatable portion and solid inwardly and outwardly extending annular portions, holding members carried by the main portion of the wheel and interlocking the solid outwardly-extending portion of the wheel, a hub secured to the inwardly-extending solid portion of the cushion, and the ends of the hub having laterally-extending portions slidably engaging the main portion of the wheel, substantially as described.

4. A pneumatic wheel comprising a main or body portion having a central opening, a pneumatic cushion situated within the said opening, the cushion having a solid central and outer or peripheral portion, metallic bands secured to opposite sides of the solid peripheral portion, holding members carried by the body portion of the wheel and having their ends extending inward and lapping over the said bands, the overlapping ends of the arms and bands having interlocking members, a hub secured to the center of the said cushion, the ends of the hub having laterally-extending supporting members loosely and slidably engaging the said holding members of the main or body portion of the wheel, substantially as described.

5. A pneumatic wheel comprising a main or body portion having a central opening, a pneumatic cushion situated within the said opening, radially-arranged holding members carried by the main portion of the wheel and having their inner ends overlapping and interlocking with the periphery of the pneumatic cushion, and a hub secured to the central portion of the cushion, the ends of the hub having laterally-extending supporting members loosely and slidably engaging the said radially-arranged holding members, substantially as described.

6. A pneumatic wheel comprising a main or body portion having a central opening, a pneumatic cushion situated therein, holding members for the penumatic cushion carried by the main or body portion of the wheel, a hub secured to the center of the pneumatic cushion, the ends of the hub having laterally-extending supporting members slidably engaging the said holding members, the holding members having stops for the sliding supporting members, substantially as described.

7. A pneumatic wheel comprising a sheet perforated main or body portion having a central opening, a pneumatic cushion situated within the said central opening, holding members projecting inwardly from opposite sides of the said sheet-body portion and interlocking with opposite sides of the said pneumatic cushion, the ends of the hub having laterally-projecting slidable members engaging the said holding members of the main portion, substantially as described.

8. A pneumatic wheel comprising a sheet perforated main portion having a central opening, a pneumatic cushion situated and secured within the said central opening, a hub connected to the center of the pneumatic cushion, the sheet perforated portion having a transversely and radially projecting opening, and the pneumatic cushion having a nipple extending within the said opening, substantially as described.

In testimony whereof I have hereunto set my hand in the presence of two subscribing witnesses.

JOSHUA SHELLABARGER.

Witnesses:
J. C. VAN FLEET,
F. E. ROBINSON.